United States Patent [19]

Flaming

[11] Patent Number: 5,209,597
[45] Date of Patent: May 11, 1993

[54] FASTENER

[76] Inventor: Paul Flaming, 6470 Avenue 424, Dinuba, Calif. 93618

[21] Appl. No.: 779,836

[22] Filed: Oct. 21, 1991

[51] Int. Cl.⁵ .............................................. F16B 1/00
[52] U.S. Cl. .................... 403/205; 403/403; 292/17
[58] Field of Search .............. 292/17, 80, 87, 91, 292/253, 303; 403/403, 205

[56] References Cited

U.S. PATENT DOCUMENTS

| | | | |
|---|---|---|---|
| 2,894,303 | 7/1959 | Armstrong et al. | 403/205 |
| 3,247,558 | 4/1966 | Kaufman | 24/457 |
| 4,068,443 | 1/1978 | Stoltz | 403/404 X |
| 4,712,942 | 12/1987 | Brown | 403/403 X |
| 4,883,303 | 11/1989 | Gross | 403/403 X |

Primary Examiner—Andrew V. Kundrat
Attorney, Agent, or Firm—Dennis B. Haase

[57] ABSTRACT

A fastener having a vertically disposed spine and a leg member disposed spaced from the spine and joined by a connector and a protuberance projecting from the spine and above the connector.

20 Claims, 2 Drawing Sheets

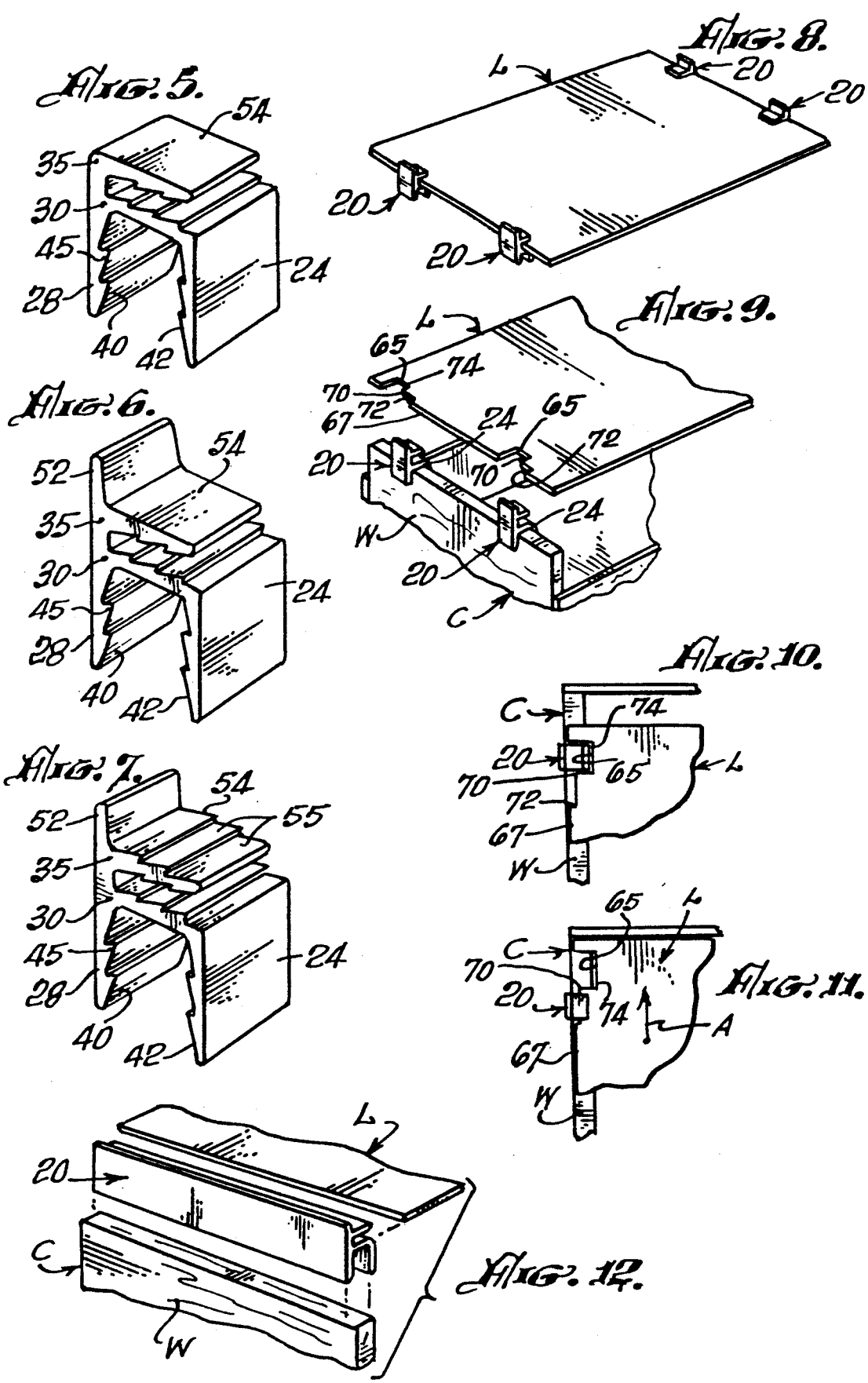

5,209,597

FASTENER

The present invention relates to improvements in fasteners for removably securing a lid to a container having at least one side wall. As will become apparent from the following specification, the fastener described and claimed herein has particular, although not exclusive, utility in agricultural uses, such as the packing of vine and tree fruit in the field.

BACKGROUND OF THE INVENTION

1. Field Of The Invention

Fresh produce has become an American passion, particularly in urban areas which are remote from growing fields.

Growers have found that it is both expedient, and profitable, to pick and pack in the fields. In order, however, to be assured of both a quality product and a sound profit margin, workers in the field must have the wherewithal to pack fresh picked fruits and vegetables quickly, cost effectively and without injury to the produce, either from packing or in transit from field to destination.

Over the years there has been a slow, but consistent, evolution in packing containers. Beginning with wooden boxes, there has been a progression to the present biodegradable materials. Since such containers are only efficient if they are stackable for shipping, the side walls must be sufficiently strong to withstand the full weight of several full boxes, while at the same time protecting the contents from bruising or other damage. Thus, many of the containers in use today still use wooden side walls, although other amalgams, such as corrugated cardboard, are also available.

2. Overview Of The Prior Art

While the container has been the focus of much change, the means by which the lid is affixed to the container has received relatively little attention.

The venerable "nail" remains in wide use, even though it is expensive to buy and expensive to use, in that workmen tend to have accidents in using nails, which cause delays and expenses.

There are innovations in lid closures which are receiving increased acceptance, among them taping devices, which permit lids to be taped onto containers, but such devices are expensive to buy and are not always easy to use. There are glue applicators in use, also, but in a hot, often dusty environment, such uses are not always effective, and since the glue is being used in proximity to foodstuffs, there are always environmental and related concerns to deal with.

As a consequence of the foregoing, the common approach in use is to slot the lid and drive tacks or nails into the sidewalls of the containers, spaced so as to align with the slots. Thus, by sliding the lid under the heads of the nails, or tacks, the lid is secured. This format presents a relatively fool proof method of closure in the field . . . only, of course, if the nails and slots are properly aligned, and, of course, the nail must protrude above the side wall by the proper amount, not too much, nor to little, and must be securely set. Once again, the number of variables in such use, which directly bear upon cost and profit, are formidable.

It is, of course, the primary objective of the present invention to obviate the several deficiencies of the prior art packing schemes, by providing a novel fastener, which is very quick and easy to use, virtually goof proof in the field, easily stored, and very inexpensive to make. Indeed, it is reusable.

A search through the applicable patent art has been conducted with little results. There are some patented clips which bear a resemblance to the fastener of the present invention. They are, however, in remote arts, and the resemblance is only superficial. In any event, for whatever benefit it may have, the patent to Kaufman, U.S. Pat. No. 3,247,558 and Poulsen, U.S. Pat. No. 4,923,260, are made of record.

DESCRIPTION OF THE DRAWINGS

Having thus established the environment in which the present invention evolved, a clear understanding of its construction and beneficial use will become clear from the detailed specification of a preferred, and several alternative, embodiments, when read in conjunction with the drawings wherein:

FIG. 5 is a modification of the clip of FIG. 4, in which certain surfaces are serrated;

FIG. 6 is a modified form of FIG. 2 in which surfaces are serrated;

FIG. 7 illustrates a form of the clip in which the upper surface of the protuberance is serrated;

FIG. 8 illustrates the interaction of a clip of the present invention and the container lid;

FIG. 9 illustrates a modified form of lid in which the lid of slid into place rather than pushed;

FIGS. 10 and 11 illustrate the combination of FIG. 9, showing the lid in its locked and unlocked positions; and FIG. 12 illustrates a form of clip which is elongated to receive the entire length of the lid.

DESCRIPTION OF A PREFERRED EMBODIMENT

Figure 1:
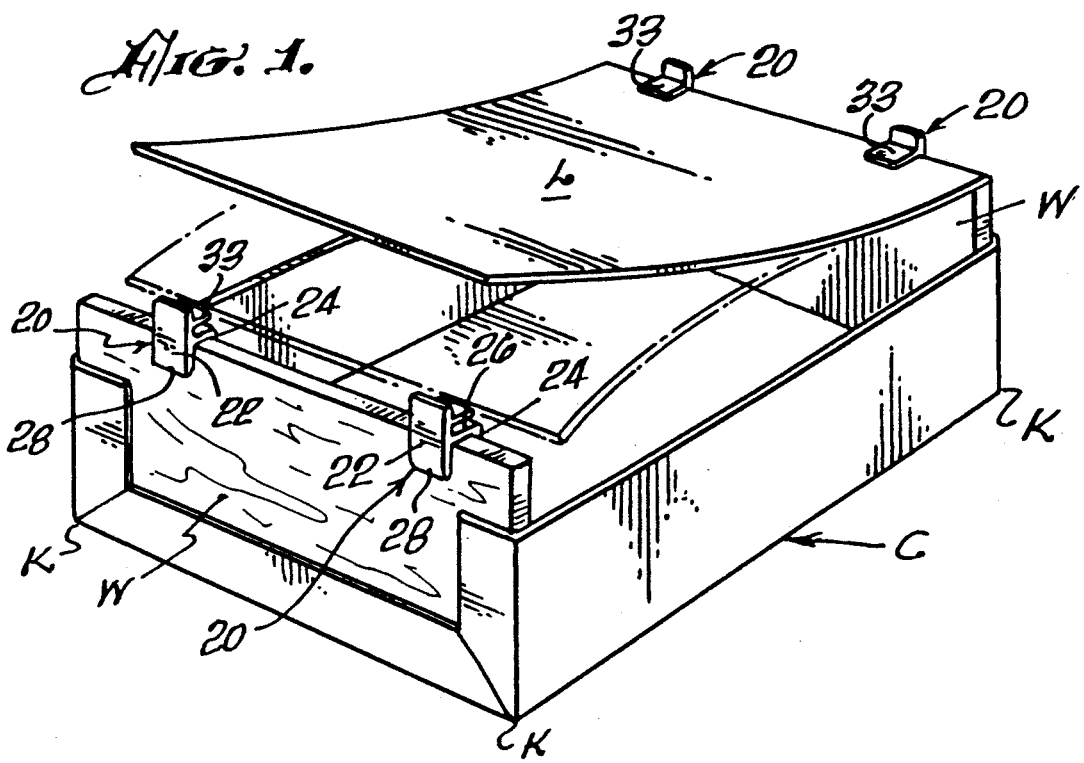
FIG. 1 is a perspective view, partially exploded, illustrating the clip of the present invention in an environment wherein it has particular, although not exclusive, utility.

With reference now to the drawings, and initially to FIG. 1, a fastener 20 is illustrated in a typical environment. As shown, fasteners constructed in accordance with the present invention are secured to a container C, having load bearing end plates or walls W. The container C, is provided with a lid L, which is engaged by the fasteners 20, as will be more fully described hereinafter.

Figure 2:
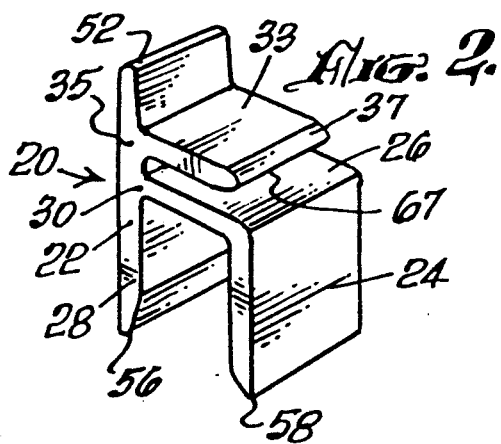
FIG. 2 is a perspective view of the preferred clip of the present invention.

In reference now to FIG. 2, the fastener 20 is, in its preferred form, a unitary structure capable of being molded, or extruded, in elongated strips, which may then be cut to a predetermined width, such as, for example, one inch.

In order to provide needed rigidity in a load bearing plane, the fastener 20 is provided with a vertically disposed spine 22. In order that the fastener 20 may receive, and be mounted on, the side wall W, a leg member 24 is provided, spaced from the spine 22 in a plane which is generally parallel thereto. In one of its forms, however, the leg may be inclined slightly inwardly toward the spine 30 so as to assure a narrowing of the space therebetween. A connector member 26 joins the spine 22 and the leg 24. The connector is relatively rigid, and holds the spine and leg in a predetermined spatial relationship, together defining a receptacle, the thickness of which is governed by the thickness of the load bearing wall W of the container C.

Referring to FIGS. 1 and 9, a receptacle, or pocket, is formed between the leg 24 and the lower portion of the spine, referencing that portion 28 of the spine beneath the point 30 at which the connector 26 is joined to the spine 22. The pocket is of such size as to permit it to receive the load bearing wall W in gripping relation by simply applying a downward pressure on the fastener once it has been positioned at the top of the wall W. In a typical use, two clips 20 spaced toward the edges of each wall will suffice.

In order, in keeping with the invention, that a lid may be easily and quickly fitted to a loaded container, each fastener is formed, or otherwise provided, with a protuberance 33, which as illustrated, takes the form of a tongue extending outwardly from a point 35 on the spine 22. The protuberance, or tongue, 33 is disposed in a plane which is generally parallel to the connector 26, extending outwardly from the point 35 to its terminus 37, which is slightly less than the extended distance of the connector from the spine. Again, as in the case of the spine 28 and leg 24, by inclining the protuberance 33 toward the plane of the connector 26, a narrowing of the space between the two is accomplished. It will now be seen that a slot 38 is formed between the protuberance 33 and the connector 26, the width of which is tailored to the thickness of the lid L of the container. The lid is thus received in the slot 38 where it is secured against inadvertent removal. In keeping with another aspect of the invention, the space or slot 38, between the protuberance 33 and connector 26 is such as to create a squeezing action which grips the lid once it is in place.

In order to enhance gripping engagement between the fastener and the wall W, the invention contemplates a roughened contact area therebetween. With reference to FIGS. 5, 6, and 7, it will be seen that the opposed inner surfaces 40 and 42, respectively, of the lower portion 28 of the spine and the leg 24, are serrated with each of the saw teeth formed to create pressure against the wall W in a direction which enhances the security of the fastener 20 in its mounted position.

In a like fashion, the gripping action in the slot 38 for the lid L is enhanced by the presence of serrations 47 and 49, formed, respectively, on the opposed inner surface of the protuberance 33 and the upper surface of the connector 26. Once again, the teeth of the serrations are slanted to create forces on the lid which tend to hold it securely in the slot.

Figure 3:
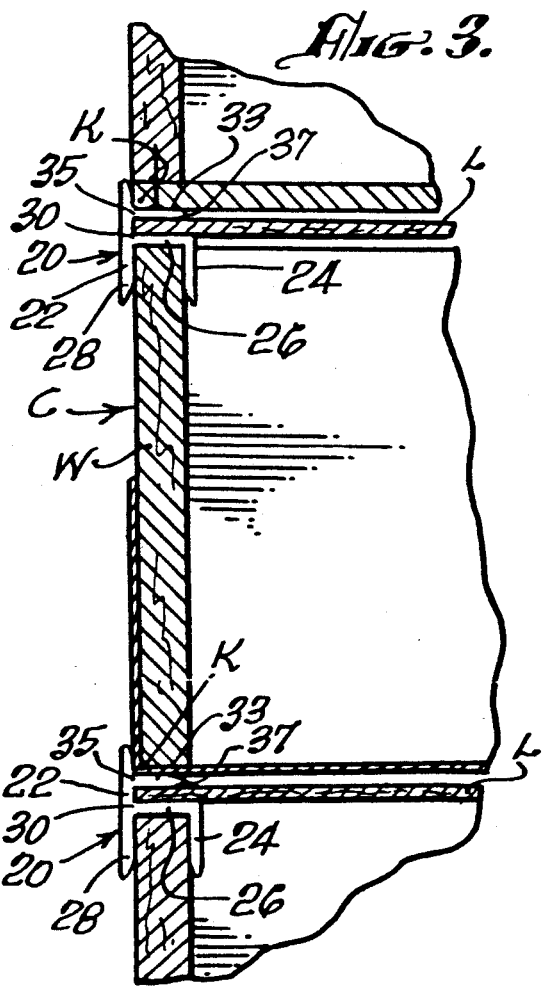
FIG. 3 illustrates a number of stacked containers, illustrating how the clip facilitates the stacking process.

In recognition of the desirability of containers of the type referenced herein being stackable, the invention further provides means for enhancing stackability. Thus, as best illustrated in FIGS. 2 and 6, by moving the connecting point 35 of protuberance 33 downward on the spine from the upper extremity thereof, the upper portion 52 of said spine 22 serves as a vertically disposed stop, which, in conjunction with the upper surface 54 of the protuberance 33, defines a corner, or foot, for receipt of the corner K of the container C, as seen in FIG. 3.

Figure 4:
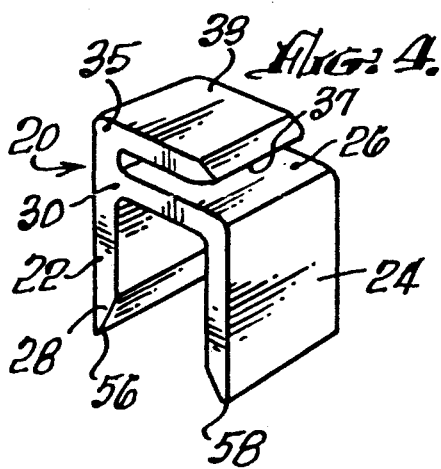
FIG. 4 is an alternative form of the clip in which no stacking elements are provided.

It is also recognized that there may be circumstances in which stackability is not a prerequisite, and may not even be desirable, such as, for example, where different size boxes are in use. In anticipation of such circumstances, fasteners of the type illustrated in FIGS. 4 and 5 are ideal. There the protuberance 33 is located at, and is integral with, the upper end of the spine 22, thereby eliminating the corner or foot previously described. By roughening, such as by providing serrations on the upper face 55 of the protuberance 33, as seen in FIG. 7, however, a non-slip character is added to the fastener, which inhibits slippage of containers that may be placed on top of the container C.

As a means of facilitating the ease with which the fastener 20 is mounted and secured to the container C, it will be seen in FIGS. 2, 4, 5, 6, and 7 that the termini, or extremities 56 and 58, respectively, of the spine 28 and leg 24, are chamfered, making it easier to push the fasteners onto the wall W, particularly where there may be some dimensional disparity between the wall thickness and the width of the receptacle. Moreover, on clips where the leg member is inclined slightly toward the spine portion 28, a narrowing of the opening between terminals 56 and 58 results in a pinching action on the wall.

As will be apparent in the same Figures, the same design philosophy is employed with respect to the slot by chamfering the free end, or terminus 61, of the protuberance 33.

The dimensional character of the clip of the present invention is such that the lid may be removed from the slots with some small effort, although inadvertent or unintended removal is inhibited. Likewise, the fasteners may be removed from the side walls after use, and may, where appropriate, be reused, all of which adds to the utility of the invention.

FIGS. 9, 10 and 11 illustrate an alternative lid configuration and mounting technique. With reference specifically to FIG. 9, it will be seen that the lid L is provided with slots 65 at the attachment end 67 thereof. It will be appreciated that while only one end is illustrated, slots 65 appear at both attachment ends of the lid.

The slot 65 is stepped at 70, presenting an intermediate opposed surface 72 and a deep opposed surface 74. Accordingly, the lid may be attached to clips 20 by dropping the lid over the top of the clips 20 at the location of the deep slots 74 and then sliding the lid laterally as indicated by arrow A in FIG. 11, to effect engagement of the lid at the intermediate surface 72 with the clip 20.

Finally, with respect to FIG. 12, the clip 20 is illustrated in another one of its various forms. Specifically, the clip 20 of FIG. 12, is elongated, and as illustrated, has the same length as the inner dimension of the side wall W. Thus, it will be apparent that a single elongated clip may replace the use of two or more shorter clips as illustrated in FIG. 1.

Having thus described a preferred embodiment, together with several alternatives, what is claimed is:

I claim:

1. A fastener for removably securing a lid, or the like, to a container of the type having relatively rigid end walls;

said fastener comprising a vertically disposed spine having upper and lower terminal ends, a leg member disposed in spaced relation with respect to said spine, connector means disposed between and interconnecting said spine and said leg between the terminal ends of said spine, so as to form, in cooperation with said spine member, a downwardly extending relatively wide receptacle for gripping engagement with a side wall of said container;

a protuberance projecting inwardly from said spine from a point immediately above said connector means and parallel thereto, such that said protuberance and said connector means together form an inwardly extending relatively narrow slot for receipt of a lid, and said spine, leg member, connector means, and protuberance each being of generally equal thickness.

2. A fastener for removably securing a lid or the like to a container having relatively rigid end walls;

said fastener comprising a vertically disposed spine having upper and lower terminal ends, a leg member disposed in spaced relationship with respect to said spine, connector means disposed between and interconnecting said spine and said leg between the terminal ends of said spine, so as to form, in cooperation with said spine member, a receptacle for engagement with a side wall of said container;

a protuberance projecting inwardly from said spine from a point immediately above said connector means and parallel thereto, such that said protuberance and said connector means together form a slot for receipt of a lid; and an upper portion of said spine extending upwardly beyond said protuberance, said upwardly extended portion of said spine and said protuberance together defining a stacking shelf.

3. The fastener as described in claim 1, wherein the various elements thereof are integrally formed into a unitary fastener.

4. The fastener as described in claim 1, wherein the inwardly facing opposed surfaces of said receptacle are roughened to provide gripping action to secure said fastener on the side wall of the container.

5. The fastener as described in claim 1, wherein the opposed surfaces defining said slot are roughened to enhance gripping engagement with the lid when inserted therein.

6. The fastener as described in claim 4, wherein the opposed surfaces defining said slot are roughened to enhance gripping engagement with the lid when inserted therein.

7. The fastener as described in claim 1, wherein the extremities of said spine, and said leg member are chamfered to facilitate mounting of said fastener on the side wall of the container.

8. The fastener as described in claim 1, wherein the free end of said protuberance is chamfered, so as to facilitate guidance of the lid into the slot.

9. The fastener as described in claim 1, wherein the extremities of said spine and said leg member are chamfered to facilitate mounting of said fastener on the side wall of the container.

10. The fastener as described in claim 1, wherein said protuberance is formed with an upper surface, and a lower surface, and said upper and lower surfaces are chamfered.

11. The fastener as described in claim 1, wherein the length of said protuberance is less than the length of said connector means, to thereby facilitate insertion of the lid into said slot.

12. The fastener as set forth in claim 1, wherein said leg member is inclined inwardly toward said spine so as to cause a narrowing at the termini thereof, resulting in a pinching action on the end wall of the container.

13. The fastener as set forth in claim 1, wherein said protuberance is inclined toward said connector means so as to cause a pinching action on the lid when inserted between the two.

14. The fastener as set forth in claim 10, wherein the length of said protuberance is less than the length of said connector means, to thereby facilitate insertion of the lid into said slot.

15. The fastener as described in claim 6, wherein the extremities of said spine and said leg member are chamfered to facilitate mounting of said fastener on the side wall of the container.

16. The fastener as described in claim 13, wherein the length of said protuberance is less than the length of said connector means, to thereby facilitate insertion of the lid into said slot.

17. A fastener for removably securing a lid, or the like, to a container of the type having relatively rigid end walls;

said fastener comprising a vertically disposed spine having upper and lower terminal ends, a leg member disposed in spaced relation with respect to said spine, connector means disposed between and interconnecting said spine and said leg between the terminal ends of said spine, so as to form, in cooperation with said spine member, a downwardly extending relatively wide receptacle for gripping engagement with a side wall of said container;

a protuberance projecting inwardly from the upper end of said spine from a point immediately above said connector means such that said protuberance and said connector means together form an inwardly extending relatively narrow slot for receipt of a lid, and said spine, leg member, connector means, and protuberance each being of generally equal thickness.

18. The fastener as described in claim 17, wherein the opposed surfaces defining said receptacle are roughened to enhance gripping engagement with the side wall when inserted therein.

19. The fastener as described in claim 17, wherein the extremities of said spine and said leg member are chamfered to facilitate mounting of said fastener on the side wall of the container.

20. The fastener as described in claim 17, wherein the opposed surfaces defining said slot are roughened to enhance gripping engagement with the lid when inserted therein.

* * * * *